United States Patent Office 3,649,547
Patented Mar. 14, 1972

3,649,547
CALCIUM POLYACRYLATE COMPOSITION AND METHOD FOR TREATING CALCIUM SALT CONTAMINATED LOW-SOLIDS DRILLING FLUIDS
James L. Lummus and Duane B. Anderson, Tulsa, Okla., assignors to Amoco Production Company, Tulsa, Okla.
No Drawing. Filed Jan. 9, 1970, Ser. No. 1,845
Int. Cl. C10m 7/02, 7/26, 7/34
U.S. Cl. 252—181
12 Claims

ABSTRACT OF THE DISCLOSURE

Certain calcium salts of partially hydrolyzed polyacrylonitrile are used to treat low-solids well drilling fluid in combination with certain water-soluble salts such as sodium carbonate to reduce fluid loss in such a way that fluid loss characteristics do not change when calcium or other metal ions having a valence of at least two are encountered during drilling. The material is especially useful in treating certain polymer-treated drilling mud.

BACKGROUND OF THE INVENTION

This invention pertains to aqueous drilling fluids or "drilling mud" used in the rotary drilling of oil wells. The drilling fluid serves to cool and lubricate the drill bit, raise drilled cuttings to the surface, and seal the sides of the well to prevent loss of drilling fluids into the formation through which the drill hole is being bored. The drilled cuttings are separated from the drilling fluid with clean fluid then recirculated. The problem of controlling the viscosity and thixotropic character of drilling fluid has been greatly solved by the use of bentonite clay. However, the problem of loss of the fluid into the drilled formations is one that still plagues the drilling of many wells.

Although there are other factors to be considered, a preferred drilling fluid is basically one that allows maximum drilling rate, has sufficient capacity to carry the drilled cuttings from the well, and will not be lost in earth formations penetrated by the drill. Many additives have been suggested and are in use in drilling fluids to achieve these goals.

Low-solids drilling mud systems, particularly of the non-dispersed type, are of current interest in drilling technology. Such a drilling mud has been taught heretofore in U.S. Pat. 3,070,543 to P. P. Scott, in which a vinyl-maleic copolymer is introduced into the drilling fluid to perform the dual function of increasing the yield of bentonite and assisting the flocculation of the low-yield clay or drilled solids encountered. Use of another dual-action polymer is taught and claimed in U.S. Pat. 3,323,603 to Lummus and Anderson. Still other dual-action polymers, such as that described in U.S. Pat. 3,472,325 to Lummus, are available and others are being developed. To control fluid loss, sodium polyacrylates have been introduced, which in addition appear to form a protective colloid to the bentonite particles and reduce viscosity. However, the drilling of formations containing anhydrite (calcium sulfate, CaSO$_4$) has presented a problem when using such non-dispersed or low-solids drilling fluids. It appears that the calcium contaminant increases the fluid loss characteristics of the mud. Although the reason for this is not completely understood, field tests indicate that the usual fluid loss additive, sodium polyacrylate, is ineffective particularly where calcium contamination of the drilling mud above 300 p.p.m. is encountered.

Contamination by metal ions having a valence of at least two can also occur when drilling cement or formations containing water-soluble magnesium, iron, aluminum salts, and the like. Such contaminating ions may also be introduced into the drilling fluid in make-up water or in brines present in drilled formations.

Although many water-soluble vinyl polymers have been claimed as fluid-loss additives including certain polyacrylates, such as in U.S. Pats. 2,552,775 and 2,718,497, the Encyclopedia of Polymer Science & Technology, published by John Wiley & Sons, Inc., vol. 5, page 150, confirms that the alkali metal salts of the polymer, such as sodium polyacrylate, are effective only in non-calcium muds, i.e., less than about 100 p.p.m. soluble calcium. See also Composition and Properties of Oil Well Drilling Fluids, by W. F. Rogers, published by Gulf Publishing Company, third edition, page 414, to this effect.

SUMMARY

It has been found that if a calcium salt of the partially hydrolyzed polyacrylonitrile is first formed and this salt is then dispersed into the drilling fluid by the use of salt such as sodium carbonate, the resulting drilling fluid has the low-fluid loss characteristics of drilling fluids containing sodium polyacrylates but is rather insensitive to both metal cations having a valence of 1 and those having a valence of 2 or more. Thus, the drilling fluid may be contaminated by high concentrations of alkali metal salts, such as sodium chloride and potassium chloride and by salts of calcium, aluminum, magnesium, iron, and the like, without serious effects on the mud properties.

The calcium salts of the partially hydrolyzed polyacrylonitriles will be referred to hereinafter simply as calcium polyacrylates for convenience. These calcium polyacrylates are substantially insoluble in water. If the materials are finely ground (to pass a 100-mesh sieve, for example), the resulting powder can be mixed into a drilling fluid and will have at least some effect.

In order to obtain the full benefits of the calcium polyacrylates, at least a small amount of alkali metal or ammonium ions should be present in the drilling fluid. Apparently, these ions can exchange with a limited number of calcium ions. The result is an increased dispersion or solubilization of the calcium polyacrylates in the aqueous drilling fluid with corresponding increased effectiveness. The rate at which the increased effectiveness takes place depends upon the ratio of the alkali metal ions to calcium ions in the drilling fluid and upon the absolute concentration of alkali metal and ammonium ions. The molar concentration of alkali metal and ammonium ions should be at least as great as the molar concentration of calcium and other cations with a valence of at least 2. A lower concentration of alkali metal and ammonium ions has some beneficial effects. Preferably, this concentration should be at least about 10 times that of the cations having a valence of at least 2.

In order to obtain an ion exchange in a period of 15 to 30 minutes, the alkali metal and ammonium ion concentration should be at least 100 parts per million and preferably at least about 200 or 300 parts per million by weight of the drilling fluid. Most water used in the field for preparing drilling fluids contains at least about 100 parts per million of sodium ions but some does not. The bentonite used in drilling fluids is sodium bentonite which contributes some sodium ions to the drilling fluid. Nevertheless, in order to insure rapid dispersion or solubilization of the calcium polyacrylate, it is best to add a water-soluble alkali metal or ammonium salt with the calcium polyacrylate. Preferably, the calcium polyacrylate and salt are pre-mixed before addition to the drilling fluid. The ratio of salt to calcium polyacrylate should be such that the alkali metal or ammonium in the salt is approximately equal to the calcium in the calcium polyacrylate. For most salts and calcium polyacrylates, this means the salt should be from about 20 to about 30 percent by weight of the calcium polyacrylate, so this is the range which is preferred in the mud additive mix. The salt concentration in the additive mix should be at least about 10 percent of the calcium polyacrylate. In the additive mix, it is preferred that at least about 50 percent of the calcium polyacrylate be present, making the salt concentration less than 50 percent. In some cases, however, the amount of the salt may be more than 50 percent.

A sudden increase in calcium ion content of a drilling fluid containing sodium polyacrylate results in precipitation of the polyacrylate and elimination of its effects. It might be supposed that after a calcium polyacrylate has been exposed to a high concentration of sodium ions, sodium polyacrylate would be regenerated and would behave much like any other sodium polyacrylate. This is not the case, however. A sudden increase in calcium content of a drilling fluid containing calcium polyacrylate dispersed by contact with sodium ions produces noticeable effects but they are slight. Apparently, once a calcium polyacrylate has been formed, most of the reaction sites are blocked. Enough remain to permit dispersion of the calcium polyacrylate by sodium ions. The number is apparently so limited, however, that neither very high concentrations of sodium ions nor of calcium ions has any great effect. This may explain why a drilling fluid containing calcium polyacrylate dispersed by alkali metal or ammonium cations is rather insensitive to contamination by high concentrations of both salts of cations with a valence of 1 and of cations with a valence of at least 2.

Calcium polyacrylate is produced by the hydrolysis of polyacrylonitrile in the presence of calcium hydroxide as described in U.S. Pat. 2,812,314 Basdekis. The polyacrylonitrile should have a molecular weight before hydrolysis between about 50,000 and about 500,000, and preferably between about 100,000 and about 300,000, as determined by Staudinger specific viscosity methods. The degree of hydrolysis may be anywhere within the range from about 30 percent to about 90 percent, the range from about 70 to about 85 percent being preferred. Enough calcium hydroxide should be present to react with substantially all the carboxylic acid groups. Some sodium hydroxide or other alkali metal or ammonium hydroxides may be present during the hydrolysis to increase the water-dispersibility of the polyacrylate. Since this also increases the sensitivity to calcium ions, however, it is preferred that the hydrolysis be carried out substantially in the absence of cations having a valence of 1.

Use of polyacrylates produced by the process described in U.S. Pat. 2,812,314 Basdekis has been suggested to beneficiate bentonite in oil-well drilling to raise the yield (number of barrels of 15-centipoise mud prepared from one ton of clay). However, the concentration suggested for such use is below the minimum of about 0.1 pound per barrel (42 U.S. gallons) of drilling fluid used for our purpose of fluid-loss reduction in drilling fluids contaminated with metal cations having a valence of at least 2.

This effect of these higher concentrations has not previously been recognized. Concentrations in the range from about 0.1 to about 0.6 pound per barrel are preferred. At least about 0.1 pound per barrel should be used to provide an appreciable fluid-loss reduction. More than about 0.6 pound per barrel can be used in some cases, however.

This invention is better understood by considering the following examples. Measurements and tests utilized in these examples were made substantially in accordance with American Petroleum Institute Standard Procedures for Testing Drilling Fluids in effect at the time.

In the examples, the calcium polyacrylate additive was the same in all cases. The material was prepared by first hydrolyzing polyacrylonitrile, having a molecular weight at about 200,000, in the presence of calcium hydroxide. The hydrolysis was continued until about 80 percent of the nitrile groups had been converted to carboxylate groups. Four parts by weight of the resulting calcium polyacrylate were then mixed with one part by weight of sodium carbonate to provide the calcium polyacryate-soda ash mix. This mix is the additive preferred for our purposes.

EXAMPLE I

While drilling a well in VanZandt County, Texas, an anhydrite formation was encountered at about 7,125 feet. The fluid loss of the low solids drilling fluid increased from about 40 to 118 cc./30 minutes. The calcium content was measured at 320 p.p.m. Approximately .4 pound per barrel of our calcium polyacrylate-soda ash mix was added and at 7,310 feet the fluid loss was reduced to 22.8 cc./30 minutes, yet the calcium content measured 380 p.p.m. The fluid loss was further reduced to 15 cc./30 minutes and maintained at this level while the calcium content decreased to 110 p.p.m. Since another anhydrite section was about to be penetrated, the drilling mud was preheated with additional calcium polyacrylate-soda ash mix (200 pounds or about .2 pound per barrel). The fluid lost after drilling into the anhydrite section remained low at 13.2 cc./30 minutes while the calcium increased to 300 p.p.m.

EXAMPLE II

A second test, in Woodward County, Okla., was slightly different in nature, as the make-up water used in the drilling mud contained from 600–800 p.p.m. calcium. A premixing pit was utilized to prepare a bentonite and vinyl-maleic copolymer slurry in fresh water to add to the mud system for viscosity control.

Ordinarily, because of the calcium and other salt content of the water, starch had been used in the past to maintain low fluid loss. This, however, reduced the drilling rate approximately 40 percent, or from about 300 feet per day to about 180 feet per day. A partial calcium polyacrylate of the type set forth in this invention was added to the pre-mix pit along with bentonite and vinyl-maleic polymer in the ratio of about 3,000 pounds bentonite, 12 pounds vinyl-maleic polymer, and 350 pounds calcium polyacrylate-soda ash mix to prepare about 150 barrels of mixture. When added to about 650 barrels of the circulating system, the fluid loss was reduced from 84 cc. to 16 cc./30 minutes. The calcium content, however, remained at 120 p.p.m. The fluid loss was maintained in the 20 cc. range from about 6,700 feet down to a total depth of 7,250 feet by additions of bentonite, low-solids polymer and calcium polyacrylate-sode ash mix, yet the drilling rate over this interval was maintained at about 300 feet per day.

EXAMPLE III

Further test was conducted on a well in Claiborne Parish, La. At a depth of about 3,900 feet, an anhydrite section was encountered. Before then, fluid loss characteristics of the low-solids type drilling mud had been maintained to 16.1 cc./30 minutes, using a sodium polyacrylate. At 3,947 feet, the fluid loss of the drilling mud increased to 132 cc./30 minutes, while the calcium content in-(creased to 300 p.p.m. Calcium polyacrylate-soda ash mix was added and reduced the fluid loss to 28 cc./30 minutes, while the calcium content of the mud was measured at 440 p.p.m at 4,052 feet. At a depth of 4,280 feet, the calcium content of the mud was measured at 600 p.p.m., yet the fluid loss of the drilling mud was 20 cc./30 minutes.

EXAMPLE IV

Calcium polyacrylate-soda ash mix of the type identified herein was further tested in drilling a well in Canada. The fluid loss of the low-solids mud prior to drilling into an anhydrite formation was measured at 12 cc./30 minutes with a calcium content of 200 p.p.m. Calcium polyacrylate-soda ash mix was added to the mud in the amount of .25 pound per barrel before drilling into the anhydrite zone. Subsequent measurement indicated the calcium content increased to 420 p.p.m., but the fluid loss did not increase above 8 cc./30 minutes.

In the field tests, it will be noted that the drilling fluid was sometimes pretreated with the calcium polyacrylate before calcium contamination took place. This is not only a possible treating procedure, but is preferred. Thus, when calcium contamination can be anticipated, the treatment may not involve adding the calcium polyacrylate to a drilling fluid after calcium-contamination occurs. Preferably, it involves adding the calcium polyacrylate to an uncontaminated drilling fluid in anticipation of contamination by calcium or other metal ions having a valence of at least 2.

As used herein, a "low-solids drilling mud" is considered to be one containing no more than 4 percent by volume of total clay solids and having a drilled solids-to-bentonite ratio of less than 2:1, as determined by calculations using drilled solids and bentonite contents from standard API tests. This may be a non-polymer system, but preferably is a dual-action polymer system such as the vinyl-maleic system taught in U.S. 3,070,543 Scott. A simple test which is applicable in most cases to determine if the mud is one to which the treatment is applicable is to mix a small amount, such as 0.5 pound per barrel, of the calcium polyacrylate into a sample of the mud. If the viscosity increases, the drilling fluid is not one to which the treatment is applicable. If the viscosity decreases, the mud is one to which the treatment is applicable.

Additional laboratory tests indicate the usefulness of the additive of this invention in low-solids mud systems with and without a dual-action polymer, as taught in said Scott patent. This is explained by the following table.

TABLE

| Drilled solids, lb./bbl. | Bentonite, lb./bbl. | Dual-action polymer, lb./bbl. | Ca, p.p.m | Ca acrylate, lb./bbl. | Plastic viscosity, cps. | Yield value, lb./100 sq. ft. | Fann gels, lb./100 sq. ft. | | Fluid loss, cc./30 min |
|---|---|---|---|---|---|---|---|---|---|
| | | | | | | | 10 sec. | 10 min. | |
| 14 | 14 | .05 | | | 12 | 35 | 27 | 51 | 11 |
| 14 | 14 | .05 | | .25 | 8 | 3 | 1 | 1 | 9 |
| 14 | 14 | | | | 6 | 2 | 1 | 3 | 12.2 |
| 14 | 14 | | 160 | | 5 | 16 | 10 | 20 | 22.5 |
| 14 | 14 | | 160 | .25 | 5 | 4 | 1 | 20 | 12.2 |

It may be seen that, by addition of the double salt in a concentration of about 0.25 pound per barrel, the plastic viscosity, gel properties and fluid loss of low-solids mud systems with and without addition of the dual-action polymer are substantially reduced. The partial calcium polyacrylates are effective to reduce fluid loss of drilling muds containing up to several hundred parts per million of calcium.

Many of the materials and methods described herein are rather specific and unique. However, some alternates, variations and equivalents will occur to those skilled in the art. Therefore, we do not wish to be limited to the examples described above, but only by the following claims.

We claim:

1. An additive for low solids aqueous drilling fluids, said additive consisting essentially of calcium polyacrylate and a water-soluble salt of a cation having a valence of 1, said calcium polyacrylate being prepared by the hydrolysis of polyacrylonitrile having a molecular weight between about 50,000 and about 500,000, said hydrolysis being continued until from about 30 percent to about 90 percent of the nitrile groups have been converted to carboxylic acid groups, and said hydrolysis being carried out in the presence of sufficient calcium hydroxide to react with substantially all of said carboxylic acid groups, said salt being present in an amount of at least about 10 percent of the weight of said calcium polyacrylate, and the cation of said salt being selected from the group consisting of the alkali metals and ammonium.

2. The additive of claim 1 in which said polyacrylonitrile has a molecular weight between about 100,000 and about 300,000, said hydrolysis is continued until from about 20 to about 85 percent of the nitrile groups have been converted to carboxylic acid groups, the hydrolysis is carried out substantially in the absence of cations having a valence of 1, and said salt is sodium carbonate and is present in an amount between about 20 and about 30 percent of the weight of said calcium polyacrylate.

3. A drilling fluid capable of withstanding contamination by both metal cations having a valence of 1 and by metal cations having a valence of at least 2, said drilling fluid comprising water, bentonite, a calcium polyacrylate and a water-soluble salt of a cation having a valence of 1, said calcium polyacrylate being prepared by the hydrolysis of polyacrylonitrile having a molecular weight between about 50,000 and about 500,000, said hydrolysis being continued until from about 30 percent to about 90 percent of the nitrile groups have been converted to carboxylic acid groups, and said hydrolysis being carried out in the presence of sufficient calcium hydroxide to react with substantially all of said carboxylic acid groups, said calcium polyacrylate being present in a concentration of at least about 0.1 pound per barrel of drilling fluid, said cation of said water-soluble salt being selected from the group consisting of alkali metals and ammonium, and being present in a concentration of at least about 100 parts per million by weight of said drilling fluid, and said drilling fluid having a total clay concentration of no more than about 4 percent by volume of said drilling fluid and having a drilled solids-to-bentonite ratio of less than about 2 to 1.

4. The drilling fluid of claim 3 in which said polyacrylonitrile has a molecular weight between about 100,000 and about 300,000, said hydrolysis is continued until from about 70 to about 85 percent of the nitrile groups have been converted to carboxylic acid groups, the hydrolysis is carried out substantially in the absence of cations having a valence of 1, and said water-soluble salt is a sodium salt.

5. The drilling fluid of claim 3 containing a dual-action polymer capable of beneficiating bentonite and flocculating drilled solids, said dual-action polymer being present in an amount sufficient to perform these functions.

6. The drilling fluid of claim 5 in which said polyacrylonitrile has a molecular weight between about 100,000 and about 300,000, said hydrolysis is continued until from about 70 to about 85 percent of the nitrile groups have been converted to carboxylic acid groups, the hydrolysis is carried out substantially in the absence of cations having a valence of 1, and said water-soluble salt is a sodium salt.

7. The drilling fluid of claim 6 in which said polymer is a vinyl-maleic copolymer.

8. A method of drilling a well in which method a drilling fluid is circulated in said well and in which said drilling fluid becomes contaminated with metal ions having a valence of at least 2 during the drilling operation, comprising circulating in said well, during the time when said contamination occurs, an aqueous drilling fluid containing bentonite but having a total clay concentration of no more than about 4 percent by volume of said drilling fluid and having a drilled solids-to-bentonite ratio of less than about 2 to 1, said drilling fluid also containing a calcium polyacrylate and a water-soluble salt of a cation having a valence of 1, said calcium polyacrylate being prepared by the hydrolysis of polyacrylonitrile having a molecular weight between about 50,000 and about 500,000, said hydrolysis being continued until from about 30 percent to about 90 percent of the nitrile groups have been converted to carboxylic acid groups, and said hydrolysis being carried out in the presence of sufficient calcium hydroxide to react with substantially all of said carboxylic acid groups, said calcium polyacrylate being present in a concentration of at least about 0.1 pound per barrel of drilling fluid, and said cation of said water-soluble salt being selected from the group consisting of alkali metals and ammonium, and being present in a concentration of at least about 100 parts per million by weight of said drilling fluid.

9. The method of claim 8 in which said polyacrylonitrile has a molecular weight between about 100,000 and about 300,000, said hydrolysis is continued until from about 70 to about 85 percent of the nitrile groups have been converted to carboxylic acid groups, the hydrolysis is carried out substantially in the absence of cations having a valence of 1, and said water-soluble salt is a sodium salt.

10. The method of claim 8 in which said drilling fluid contains a dual-action polymer capable of beneficiating bentonite and flocculating drilled solids, said dual-action polymer being present in an amount sufficient to perform these functions.

11. The method of claim 10 in which said polyacrylonitrile has a molecular weight between about 100,000 and about 300,000, said hydrolysis is continued until from about 70 to about 85 percent of the nitrile groups have been converted to carboxylic acid groups, the hydrolysis is carried out substantially in the absence of cations having a valence of 1, and said water-soluble salt is a sodium salt.

12. The method of claim 11 in which said polymer is a vinyl-maleic copolymer.

References Cited

UNITED STATES PATENTS

| | | | |
|---|---|---|---|
| 2,552,775 | 5/1951 | Fischer | 252—8.5 |
| 2,718,497 | 9/1955 | Oldham | 252—8.5 |
| 3,022,279 | 2/1962 | Proffitt | 252—181 X |
| 3,070,543 | 12/1962 | Scott | 252—8.5 |
| 3,081,260 | 3/1963 | Park | 252—8.5 |
| 3,220,946 | 11/1965 | Turner | 252—8.5 |
| 3,323,603 | 6/1967 | Lummus et al. | 252—8.5 X |
| 3,434,970 | 3/1969 | Siegele | 252—8.5 |
| 3,472,325 | 10/1969 | Lummus | 252—8.5 |

JOHN T. GOOLKASIAN, Primary Examiner

M. E. McCAMISH, Assistant Examiner

U.S. Cl. X.R.

210—58, 59; 252—8.55 B, 180